(12) United States Patent
Caveny et al.

(10) Patent No.: US 7,435,293 B2
(45) Date of Patent: Oct. 14, 2008

(54) CEMENT COMPOSITIONS COMPRISING MALTODEXTRIN

(75) Inventors: William J. Caveny, Rush Springs, OK (US); Rickey L. Morgan, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/379,482

(22) Filed: Apr. 20, 2006

(65) Prior Publication Data

US 2007/0125278 A1 Jun. 7, 2007

Related U.S. Application Data

(63) Continuation-in-part of application No. 11/291,743, filed on Dec. 1, 2005, now Pat. No. 7,303,625.

(51) Int. Cl.
*C04B 24/10* (2006.01)
*C04B 24/38* (2006.01)

(52) U.S. Cl. .................. 106/728; 106/729; 106/730

(58) Field of Classification Search .............. 106/728, 106/729, 730
See application file for complete search history.

(56) References Cited

U.S. PATENT DOCUMENTS

| | | | | |
|---|---|---|---|---|
| 3,615,223 | A * | 10/1971 | Burrqughs et al. | 356/409 |
| 3,954,489 | A * | 5/1976 | Uchikawa et al. | 106/695 |
| 4,095,987 | A | 6/1978 | Walker | |
| 4,131,480 | A * | 12/1978 | McCurrich et al. | |
| 4,432,801 | A | 2/1984 | Tegiacchi et al. | |
| 4,502,969 | A | 3/1985 | Shell | |
| 5,220,960 | A | 6/1993 | Totten et al. | |
| 5,264,470 | A | 11/1993 | Eoff | |
| 5,281,270 | A | 1/1994 | Totten et al. | |
| 5,447,197 | A | 9/1995 | Rae et al. | |
| 5,547,506 | A | 8/1996 | Rae et al. | |
| 5,728,209 | A * | 3/1998 | Bury et al. | 106/819 |
| 6,173,778 | B1 | 1/2001 | Rae et al. | |
| 6,227,294 | B1 | 5/2001 | Chatterji et al. | |
| 6,461,658 | B1 | 10/2002 | Merkel et al. | |
| 6,722,433 | B2 | 4/2004 | Brothers et al. | |
| 6,797,050 | B2 * | 9/2004 | Hoffman et al. | 106/696 |
| 6,832,652 | B1 | 12/2004 | Dillenbeck et al. | |
| 7,067,000 | B1 | 6/2006 | Szymanski et al. | |
| 7,303,625 | B2 | 12/2007 | Caveny et al. | |
| 2001/0050031 | A1* | 12/2001 | Bredt et al. | 106/162.9 |
| 2003/0091714 | A1 | 5/2003 | Merkel et al. | |
| 2003/0176293 | A1 | 9/2003 | Schilling et al. | |
| 2007/0125277 | A1 | 6/2007 | Caveny et al. | |
| 2007/0125538 | A1 | 6/2007 | Caveny et al. | |
| 2007/0125539 | A1 | 6/2007 | Caveny et al. | |
| 2007/0129260 | A1 | 6/2007 | Caveny et al. | |
| 2007/0129261 | A1 | 6/2007 | Caveny et al. | |

FOREIGN PATENT DOCUMENTS

| | | |
|---|---|---|
| EP | 0 582 367 A | 2/1994 |
| WO | WO 2004/076376 A | 9/2004 |
| WO | WO 2005/036986 A | 4/2005 |

OTHER PUBLICATIONS

Material Safety Data Sheet for "Splenda® Brand Sucralose, Crystalline Solid Form," dated Jan. 7, 2003.
National Industry Chemicals Notification and Assessment Scheme (NICNAS) Full Public Report On Slenda/Sucralose dated Apr. 2003.
Caveny, William et al., "Methods of Treating Subterranean Formations Using Treatment Fluids Comprising Chlorinated Carbohydrates" filed Dec. 1, 2005 as U.S. Appl. No. 11/291,718.
Caveny, William et al., "Additives Comprising Chlorinated Carbohydrates" filed Dec. 1, 2005 as U.S. Appl. No. 11/291,720.
Caveny, William et al., "Treatment Fluids Comprising Chlorinated Carbohydrates" filed Dec. 1, 2005 as U.S. Appl. No. 11/291,743.
Splenda® package, undated but admitted to be prior art.
Splenda® No Calorie Sweetener FAQ's, printed from http://www.splenda.com/print.jhtml?is=splenda/fags/nocalorie.inc on Mar. 22, 2006.
Caveny, William et al., "Additives Comprising Maltodextrin" filed Apr. 20, 2006 as U.S. Appl. No. 11/379,490.
Caveny, William et al., "Methods of Cementing Subterranean Formations Using Cement Compositions Comprising Maltodextrin" filed Apr. 20, 2006 as U.S. Appl. No. 11/379,489.
Office Action dated May 24, 2007 from U.S. Appl. No. 11/379,489.
Foreign Search Report from a related application, Nov. 20, 2007.
Notice of Allowance from U.S. Appl. No. 11/291,743, filed Oct. 22, 2007.
Notice of Allowance from U.S. Appl. No. 11/291,743, filed Sep. 11, 2007.
Notice of Allowance from U.S. Appl. No. 11/291,743, filed Aug. 3, 2007.
Office Action from U.S. Appl. No. 11/291,743, filed Dec. 27, 2006.
Notice of Allowance from U.S. Appl. No. 11/291,718, filed Nov. 6, 2007.

(Continued)

*Primary Examiner*—Paul Marcantoni
(74) *Attorney, Agent, or Firm*—Craig W. Roddy; Baker Botts, LLP.

(57) ABSTRACT

Cement compositions, and more particularly, cement compositions that include maltodextrin. An example is a cement composition that includes: a hydraulic cement, water, and an additive comprising maltodextrin. Another example is a cement composition that includes: a hydraulic cement, water, and an additive comprising maltodextrin and an organic acid. Another example is a cement composition that includes: a hydraulic cement, water, and an additive comprising maltodextrin and tartaric acid.

23 Claims, No Drawings

OTHER PUBLICATIONS

Notice of Allowance from U.S. Appl. No. 11/291,718, filed Sep. 25, 2007.
Office Action from U.S. Appl. No. 11/379,489, filed Nov. 27, 2007.
Office Action from U.S. Appl. No. 11/379,489, filed May 24, 2007.
Notice of Allowance from U.S. Appl. No. 11/291,718, filed Mar. 19, 2008.
Notice of Allowance from U.S. Appl. No. 11/379,489, filed Mar. 4, 2008.
Notice of Allowance from U.S. Appl. No. 11/291,718, filed Apr. 14, 2008.
Notice of Allowance for U.S. Appl. No. 11/379,489 dated Apr. 25, 2008.
Notice of Allowance for U.S. Appl. No. 11/291,720 dated May 12, 2008.

* cited by examiner

CEMENT COMPOSITIONS COMPRISING MALTODEXTRIN

CROSS-REFERENCE TO RELATED APPLICATIONS

This application is related to co-pending U.S. patent application Ser. No. 11/291,718, entitled "Methods of Cementing Subterranean Formations Using Cement Compositions Comprising Maltodextrin," and U.S. patent application Ser. No. 11/291,720, entitled "Additives Comprising Maltodextrin," both filed on the same day herewith, the entirety of all of which is herein incorporated by reference. This application is a continuation in part of U.S. patent application Ser. No. 11/291,743, entitled "Treatment Fluids Comprising Chlorinated Carbohydrates," filed on Dec. 1, 2005, now U.S. Pat. No. 7,303,625.

BACKGROUND

The present invention relates to surface and subterranean cementing operations, and more particularly, to cement compositions that comprise maltodextrin, and associated methods.

Hydraulic cement compositions commonly are utilized in surface and subterranean cementing operations. Examples of subterranean cementing operations include, for example, subterranean well completion and remedial operations. For example, cement compositions are used in primary cementing operations whereby pipe strings such as casings and liners are cemented in well bores. In performing primary cementing, cement compositions are pumped into the annular space between the walls of a well bore and the exterior surface of a pipe string disposed therein. The cement composition is permitted to set in the annular space, thereby forming an annular sheath of hardened substantially impermeable cement therein that supports and positions the pipe string in the well bore and bonds the exterior surface of the pipe string to the walls of the well bore. Cement compositions also are used in remedial cementing operations such as plugging highly permeable zones or fractures in well bores, plugging cracks and holes in pipe strings, and the like.

Subterranean cementing operations generally occur under a wide variety of well bore conditions, for example, ranging from shallow wells (less than about 1,000 feet) to extremely deep wells (greater than about 35,000 feet). Generally, a cement composition that is to be used in subterranean cementing operations should remain in a pumpable state until it has been placed into the desired location within the subterranean formation. Conventional set retarder compositions often have been included in cement compositions, so as to retard the set time of the cement composition until the cement composition has reached its ultimate location within the subterranean formation. As used herein, the phrase "conventional set retarder compositions" refers to a wide variety of compositions commonly used in cementing operations for delaying the set time of a cement composition, including, for example, lignosulfonates, organic acids, phosphonic acid derivatives, synthetic polymers (e.g., copolymers of 2-acrylamido-2-methylpropane sulfonic acid ("AMPS") and unsaturated carboxylic acids), inorganic borate salts, and combinations thereof. However, conventional set retarders such as those described above may be costly and problematic in some instances. For example, conventional set retarders often undesirably may slow the development of a cement's compressive strength. Furthermore, conventional set retarders may affect gas-migration-control properties, and may not be suitable for use in certain applications.

SUMMARY

The present invention relates to surface and subterranean cementing operations, and more particularly, to cement compositions that comprise maltodextrin, and associated methods.

An example of a cement composition of the present invention is a cement composition comprising a hydraulic cement, water, and an additive comprising maltodextrin.

Another example of a cement composition of the present invention is a cement composition comprising a hydraulic cement, water, and an additive comprising maltodextrin and an organic acid, wherein the additive is present in the cement composition in an amount in the range of from about 0.01% to about 5% by weight of the hydraulic cement.

Another example of a cement composition of the present invention is a cement composition comprising a hydraulic cement, water, and an additive comprising maltodextrin and tartaric acid, wherein the maltodextrin is present in the additive in an amount in the range of from about 0.01% to about 99.9% by weight, and the tartaric acid is present in the additive in an amount in the range of from about 0.01% to about 99.9% by weight.

The features and advantages of the present invention will be apparent to those skilled in the art. While numerous changes may be made by those skilled in the art, such changes are within the spirit of the invention.

DESCRIPTION OF PREFERRED EMBODIMENTS

The present invention relates to surface and subterranean cementing operations, and more particularly, to cement compositions that comprise additives that comprise maltodextrin, and associated methods. While the compositions and methods of the present invention are useful in a variety of applications, they may be particularly useful for subterranean well completion and remedial operations, such as primary cementing of casings and liners in well bores, including those in production wells, which include multi-lateral subterranean wells. They also may be useful for surface cementing operations, including construction cementing operations.

The cement compositions of the present invention generally comprise a cement, water, and an additive that comprises maltodextrin. Among other things, the presence of maltodextrin in the cement compositions of the present invention may retard the setting time of the cement compositions of the present invention, without delaying compressive strength development. In some embodiments, the maltodextrin, inter alia, may retard the setting time of the cement compositions while accelerating early compressive strength development. In certain embodiments, the cement compositions of the present invention comprising maltodextrin ultimately may develop compressive strength that exceeds the compressive strength that the cement compositions of the present invention ultimately would develop without the presence of the maltodextrin. Certain embodiments of the cement compositions of the present invention may further enhance gas migration control properties in oil and gas wells. In some embodiments, the presence of maltodextrin in the cement composition may contribute to a viscosity appropriate for discouraging any flow of gas into the annulus.

Cements suitable for use in subterranean applications are suitable for use in the present invention. Furthermore, cements suitable for use in surface applications (e.g., construction cements) also may be suitable for use in the present invention. In certain embodiments, the cement compositions of the present invention comprise a hydraulic cement. A variety of hydraulic cements are suitable for use, such as those comprising one or more of calcium, aluminum, silicon, oxygen, and sulfur, which set and harden by reaction with water. Such hydraulic cements include, but are not limited to, Portland cements, pozzolanic cements, gypsum cements, high alumina content cements, silica cements, high alkalinity cements, slag cements, shale cements, and mixtures thereof. In certain embodiments, a hydraulic cement may be used that comprises a mixture of Portland cement and slag. In certain embodiments, a hydraulic cement may be used that comprises slag activated with a suitable alkali activator (e.g., soda ash and/or caustic). In certain embodiments, the hydraulic cement may comprise a vitrified shale. An example of a suitable vitrified shale is commercially available under the trade name "PRESSURE-SEAL® FINE LCM" vitrified shale from TXI Energy Services, Inc., Houston, Tex. In certain embodiments, the hydraulic cement may comprise an API cement, such as API Classes A, B, C, G, H, or J Portland cements, or equivalents thereof. The above-mentioned API cements are defined and described in API Specification for Materials and Testing for Well Cements, API Specification 10A, 22nd Edition, dated Jan. 1, 1995.

The water utilized in the cement compositions of the present invention may be fresh water, saltwater (e.g., water containing one or more salts dissolved therein), brine (e.g., saturated saltwater), or seawater. Generally, the water may be from any source provided that it does not contain an excess of compounds that adversely affect the cement compositions. The water may be present in an amount sufficient to form a pumpable slurry. Generally, the water is present in the cement compositions of the present invention in an amount in the range of from about 15% to about 200% by weight of cement ("bwoc") therein. In certain embodiments, the water may be present in the cement compositions of the present invention in an amount in the range of from about 25% to about 60% bwoc therein.

The cement compositions of the present invention also comprise an additive that comprises maltodextrin. As referred to herein, the term "maltodextrin" will be understood as a white hygroscopic powdered carbohydrate derived from maize starch. Maltodextrin has been assigned CAS Number 9050-36-6. A suitable source of maltodextrin is commercially available from Sigma-Aldrich Co. and can be obtained with varying dextrose equivalents of 4.0-7.07, 13-17, and 16.5-19.5. Another suitable source of maltodextrin is commercially available from Main Street Ingredients, La Crosse, Wis., under the trade name "SPLENDA."

Generally, the additive that comprises maltodextrin should be present in the cement compositions of the present invention in an amount sufficient to retard the setting of the cement compositions of the present invention for a desired time. The amount of maltodextrin that may be included may depend on a number of factors, including, but not limited to, the bottom hole circulating temperature of the well into which the cement composition is to be placed, the particular formulation of the chosen maltodextrin (e.g., the particular dextrose equivalent of the chosen maltodextrin), and the like. In some embodiments, the quantity of the maltodextrin to be included in the cement composition may be determined prior to preparation of the cement composition. For example, the quantity of the maltodextrin to be included in the cement composition may be determined by performing thickening time tests of the type described in API Specification 10A, Twenty-Third Edition, April, 2002. More particularly, in certain embodiments, the maltodextrin may be present in the cement compositions of the present invention in an amount in the range of from about 0.01% to about 5% bwoc. In some embodiments, the maltodextrin may be present in the cement compositions of the present invention in an amount in the range of from about 0.1% to about 2% bwoc.

Optionally, the cement compositions of the present invention may comprise a dispersant. When present, the dispersant, among other things, may control the rheology of the cement composition and stabilize the cement composition over a broad density range. A variety of dispersants known to those skilled in the art may be used in accordance with the present invention. An example of a suitable dispersant is a water-soluble polymer prepared by the caustic-catalyzed condensation of formaldehyde with acetone wherein the polymer contains sodium sulfate groups, which dispersant is commercially available under the trade designation "CFR-3™" dispersant from Halliburton Energy Services, Inc., Duncan, Okla. Another suitable dispersant is commercially available under the trade designation "CFR-2™" dispersant, also from Halliburton Energy Services, Inc., of Duncan, Okla. Where used, the dispersant may be present in the cement compositions of the present invention in an amount in the range of from about 0.1% to about 2.0% bwoc. In some embodiments, the dispersant may be present in the cement compositions of the present invention in an amount in the range of from about 0.1% to about 1.0% bwoc.

Optionally, the cement compositions of the present invention may comprise a hydratable polymer. When present in the cement compositions of the present invention, the hydratable polymer may increase the viscosity of the cement compositions of the present invention, among other things. Various hydratable polymers can be utilized in the cement compositions of the present invention including, but not limited to, carboxymethylcellulose, hydroxyethylcellulose, carboxymethylhydroxyethylcellulose, vinyl sulfonated polymers, and hydratable graft polymers. An example of a suitable hydratable polymer is a cellulose derivative commercially available from Dow Chemical Co., under the trade name "CARBOTRON 20." Where used, the hydratable polymer may be present in the cement compositions of the present invention in an amount sufficient to contribute a desired degree of viscosity to the cement composition slurries of the present invention. In some embodiments, the hydratable polymer may be present in the cement compositions of the present invention in an amount in the range of from about 0.01% to about 5% bwoc. In some embodiments, the hydratable polymer may be present in the cement compositions of the present invention in an amount in the range of from about 0.1% to about 2% bwoc.

As noted above, the additives of the present invention generally comprise maltodextrin. In certain embodiments of the present invention, the additives of the present invention may comprise about 100% maltodextrin. In certain embodiments of the present invention, maltodextrin may be combined with an organic acid to form another additive of the present invention. Examples of organic acids that may be suitable include, but are not limited to, citric acid, gluconic acid, tartaric acid, and salts thereof. In certain embodiments of the present invention, maltodextrin may be present in the additives of the present invention in an amount in the range of from about 0.1% to about 99.9% by weight. In certain embodiments of the present invention, one or more organic acids may be present in the additives of the present invention in an amount in the range of from about 0.1% to about 99.9% by weight. In certain embodiments of the present invention, the additives of the present invention that comprise maltodextrin and an organic acid may comprise about 60% to about 90% maltodextrin by weight, and about 10% to about 40% organic acid by weight. In certain embodiments of the present invention, the additives of the present invention that comprise maltodextrin and an organic acid may comprise about 70% to about 80% maltodextrin by weight, and about 20% to about 30% organic acid by weight. In certain embodiments of the present invention, the additives of the present invention that comprise maltodextrin and an organic acid may comprise about 40% to about 60% maltodextrin by weight, and about 40% to about 60% organic acid by weight. In certain embodiments of the present invention the additives of the present invention that comprise maltodextrin and an organic acid may comprise tartaric acid in an amount in the range of from about 10% to about 70% by weight of the maltodextrin. In certain embodiments of the present invention the additives of the present invention that comprise maltodextrin and an organic acid may comprise organic acid in an amount in the range of from about 25% to about 45% by weight of the maltodextrin.

In certain embodiments of the present invention, the additives comprising maltodextrin may comprise, inter alia, borate compounds, including acids comprising borate compounds, and salts of such acids. Examples of suitable borate compounds include, for example, boric acid, potassium pentaborate, and the like. In certain embodiments of the present invention, the additives comprising maltodextrin may comprise, inter alia, phosphorus compounds, including acids comprising phosphorus compounds, and salts of such acids. Examples of suitable borate compounds include, for example, phosphates, phosphonates, and the like. In certain embodiments of the present invention, the additives comprising maltodextrin may comprise, inter alia, a wide variety of lignins and tannins. In certain embodiments of the present invention, the additives comprising maltodextrin may comprise, inter alia, hydrolyzed copolymers of acrylamide ("AA") and 2-acrylamido, 2-methyl propane sulfonic acid ("AMPS"). In certain embodiments of the present invention, the additives comprising maltodextrin may comprise, inter alia, sugar compounds, including, for example, dextrose, sucrose, fructose, and the like.

The additives of the present invention comprising maltodextrin may retard the setting of the cement compositions of the present invention at a variety of temperatures, including temperatures of up to about 200° F. in certain embodiments, temperatures of up to about 250° F. in certain embodiments, temperatures of up to about 300° F. in certain embodiments, temperatures of up to about 350° F. in certain embodiments, and temperatures greater than about 350° F. in certain embodiments.

The cement compositions of the present invention comprising additives that comprise maltodextrin may be suitable for use at a variety of temperatures. Certain embodiments of the cement compositions of the present invention are suitable for use at temperatures of up to about 200° F. Certain embodiments of the cement compositions of the present invention are suitable for use at temperatures of up to about 250° F. Certain embodiments of the cement compositions of the present invention are suitable for use at temperatures of up to about 300° F. Certain embodiments of the cement compositions of the present invention are suitable for use at temperatures of up to about 350° F. Certain embodiments of the cement compositions of the present invention may be suitable for use at temperatures greater than about 350° F. In some embodiments, additives may be included in the cement compositions of the present invention to facilitate use at elevated temperatures.

As will be recognized by those skilled in the art, the cement compositions of this invention also may include additional suitable additives, including, among other things, accelerants, latex stabilizers, defoamers, silica, microspheres, viscosifiers, fibers, weighting materials, salts, vitrified shale, calcium hydroxide, fly ash, fluid loss control additives, set retarders and the like. Any suitable additive may be incorporated within the cement compositions of the present invention. An example of a suitable defoamer is commercially available from Halliburton Energy Services, Inc., of Duncan, Okla., under the trade name "D-AIR 3000L™" antifoaming agent. An example of a suitable silica is a fine silica flour that is commercially available from Halliburton Energy Services, Inc., of Duncan, Okla., under the trade name "SSA-1™" fine silica flour. An example of a suitable high-temperature viscosifier is commercially available from Halliburton Energy Services, Inc., of Duncan, Okla., under the trade name "SUSPEND HT" anti-settling additive. An example of a suitable free-water and solids suspending agent is commercially available from Halliburton Energy Services, Inc., of Duncan, Okla., under the trade name "SA-541™" suspending aid. Examples of suitable fluid loss control additives are commercially available from Halliburton Energy Services, Inc., at various locations, under the trade names "FWCA" additive, LATEX 2000™, "HALAD® 9,""HALAD® 344," "HALAD® 400," and "HALAD® 413." Examples of suitable set retarders include various organic acids including, but not limited to, tartaric acid, citric acid, gluconic acid, oleic acid, phosphoric acid, and uric acid. An example of a suitable tartaric acid is commercially available from Halliburton Energy Services, Inc., of Duncan, Okla., under the trade name "HR®-25" retarder. An example of a suitable latex stabilizer is commercially available from Halliburton Energy Services, Inc., under the trade name "STABILIZER 434D." Another example of a compound that may be suitable for inclusion in the cement compositions of the present invention is an additive comprising octoborate, such as disodium octoborate that is commercially available from Spectracide Chemicals. One of ordinary skill in the art, with the benefit of this disclosure, will be able to recognize where a particular additive is suitable for a particular application.

To facilitate a better understanding of the present invention, the following illustrative examples of some of the preferred embodiments are given. In no way should such examples be read to limit, or define, the entire scope of the invention.

EXAMPLE 1

Sample cement compositions were prepared as follows. A cementitious material (Texas Lehigh Class H cement) and maltodextrin were dry blended by adding dry materials in a one-liter glass jar and shaking vigorously. In some sample cement compositions, as indicated below, a chlorinated carbohydrate was also dry blended with the sample cement compositions. Next, a slurry was formed by adding an amount of water in a one-liter Waring blender, and then adding the dry-blended materials while the blender operated at about 2,500 rpm. Once all dry-blended materials had been added, the mixture in the blender was sheared at about 13,000 rpm for 35 seconds. Next, tests were run to determine the pump time of the sample composition at high temperature and high pressure according to API RP 10B, "Recommended Practices for Testing Oil-Well Cements and Cement Additives," dated 1974. Sample Composition Nos. 1, 2, 6, 11, and 12 also were tested using an ultrasonic cement analyzer to determine the strength of each sample composition at a desired temperature and pressure.

Sample Composition Nos. 1 and 2 comprised Texas Lehigh Class H cement and 39.4% water bwoc, with no maltodextrin or chlorinated carbohydrate.

0.1% SPLENDA (comprising both sucralose and maltodextrin) bwoc and 39.4% water bwoc.

Sample Composition No. 11, a cement composition of the present invention, comprised Texas Lehigh Class H cement, 0.25% SPLENDA (comprising both sucralose and maltodextrin) bwoc and 39.4% water bwoc.

The results of the testing are set forth in Tables 1 and 2 below.

TABLE 1

| Sample Composition | Water (% bwoc) | Maltodextrin (% bwoc) | Sucralose (% bwoc) | SPLENDA (% bwoc) | Test Temp. (° F.) | Pump Time (hr:min) |
|---|---|---|---|---|---|---|
| No. 1 | 39.4 | 0 | 0 | 0 | 140 | 1:34 |
| No. 2 | 39.4 | 0 | 0 | 0 | 206 | 0:48 |
| No. 3 | 39.4 | 0.1 | 0 | 0 | 140 | 4:59 |
| No. 4 | 39.4 | 0.1 | 0 | 0 | 140 | 5:05 |
| No. 5 | 39.4 | 0.25 | 0 | 0 | 206 | 9:23 |
| No. 6 | 39.4 | 0.25 | 0 | 0 | 206 | 4:50 |
| No. 7 | 39.4 | 0.25 | 0 | 0 | 206 | 5:05 |
| No. 8 | 39.4 | 0.25 | 0 | 0 | 206 | 14:15 |
| No. 9 | 39.4 | 0 | 0.25 | 0 | 206 | 2:51 |
| No. 10 | 39.4 | present as part of SPLENDA | present as part of SPLENDA | 0.1 | 140 | 4:50 |
| No. 11 | 39.4 | present as part of SPLENDA | present as part of SPLENDA | 0.25 | 206 | 10:43 |

TABLE 2

| Sample Composition | Water (% bwoc) | Maltodextrin (% bwoc) | Sucralose (% bwoc) | SPLENDA (% bwoc) | Test Temp. (° F.) | 500 Psi Time (hr:min) | 24 Hr. Strength (psi) | 48 Hr. Strength (psi) | 48 Hr. Crush (psi) |
|---|---|---|---|---|---|---|---|---|---|
| No. 1 | 39.4 | 0 | 0 | 0 | 140-156 | 3:23 | 2,569 | 3,300 | 4,860 |
| No. 2 | 39.4 | 0 | 0 | 0 | 206-250 | 2:40 | 2,620 | 2,800 | 4,960 |
| No. 5 | 39.4 | 0.25 | 0 | 0 | 206-250 | 6:41 | 2,928 | 3,100 (at 40 hr) | 4,350 (at 40 hr) |
| No. 10 | 39.4 | present as part of SPLENDA | present as part of SPLENDA | 0.1 | 140-156 | 14:03 | 1,951 | 3,100 | 5,000 |
| No. 11 | 39.4 | present as part of SPLENDA | present as part of SPLENDA | 0.25 | 206-250 | 3:58 | 4,060 | 4,720 | 6,860 |

Sample Composition No. 3, a cement composition of the present invention, comprised Texas Lehigh Class H cement, 0.1% maltodextrin 4.0-7.07 bwoc, and 39.4% water bwoc.

Sample Composition No. 4, a cement composition of the present invention, comprised Texas Lehigh Class H cement, 0.1% Maltodextrin 40 DE bwoc, and 39.4% water bwoc.

Sample Composition No. 5, a cement composition of the present invention, comprised Texas Lehigh Class H cement, 0.25% maltodextrin 4.0-7.07 bwoc, and 39.4% water bwoc.

Sample Composition No. 6, a cement composition of the present invention, comprised Texas Lehigh Class H cement, 0.25% maltodextrin 16.5-19.5 bwoc, and 39.4% water bwoc.

Sample Composition No. 7, a cement composition of the present invention, comprised Texas Lehigh Class H cement, 0.25% maltodextrin 13-17 bwoc, and 39.4% water bwoc.

Sample Composition No. 8, a cement composition of the present invention, comprised Texas Lehigh Class H cement, 0.25% Maltodextrin 40 DE bwoc, and 39.4% water bwoc.

Sample Composition No. 9, a cement composition of the present invention, comprised Texas Lehigh Class H cement, 0.25% sucralose bwoc, and 39.4% water bwoc.

Sample Composition No. 10, a cement composition of the present invention, comprised Texas Lehigh Class H cement, In Table 2 above, the caption "500 Psi Time" refers to the time required for the sample composition to develop 500 psi compressive strength. The captions "24 Hr. Strength (psi)" and "48 Hr. Strength (psi)" refer to the strength (measured in psi) that the sample composition had attained by 24 hours, and 48 hours, respectively, after the onset of testing. The caption "48 Hr. Crush Strength (psi)" refers to the strength (measured in psi) required to crush the sample composition at a time 48 hours after the onset of testing.

Example 1 illustrates, inter alia, that the cement compositions of the present invention comprising maltodextrin are suitable for use in subterranean and surface cementing operations.

EXAMPLE 2

Sample cement compositions were prepared as follows. A cementitious material (Texas Lehigh Class H cement) and maltodextrin were dry blended by adding dry materials in a one-liter glass jar and shaking vigorously. In some sample cement compositions, as indicated below, one or more of the following additives were also dry blended with the sample cement compositions: SSA-1™ fine silica flour, HALAD® 413 additive, FWCA additive, SA-541™ suspending aid, and SUSPEND HT anti-settling additive. Next, a slurry was formed by adding an amount of water in a one-liter Waring blender, and then adding the dry-blended materials while the blender operated at about 2,500 rpm. Once all dry-blended materials had been added, the mixture in the blender was sheared at about 13,000 rpm for 35 seconds. Next, tests were run to determine the pump time of the sample composition at high temperature and high pressure according to API RP 10B, "Recommended Practices for Testing Oil-Well Cements and Cement Additives," dated 1974.

Sample Composition No. 12, a cement composition of the present invention, comprised Texas Lehigh Class H cement, 1% maltodextrin 4.0-7.07 bwoc, 0.1% FWCA additive bwoc, 0.2% SUSPEND HT anti-settling additive bwoc, and 39.3% water bwoc.

Sample Composition No. 13, a cement composition of the present invention, comprised Texas Lehigh Class H cement, 1.2% maltodextrin 4.0-7.07 bwoc, 35% SSA-1™ fine silica flour bwoc, 0.5% HALAD® 413 bwoc, 0.2% SA-541™ suspending aid bwoc, and 48.26% water bwoc.

Sample Composition No. 14, a cement composition of the present invention, comprised Texas Lehigh Class H cement, 1.5% maltodextrin 4.0-7.07 bwoc, 35% SSA-1™ fine silica flour bwoc, 0.5% HALAD® 413 bwoc, 0.2% SA-541™ suspending aid bwoc, and 48.26% water bwoc.

The results of the testing are set forth in Table 3 below.

Waring blender, and then adding the dry-blended materials while the blender operated at about 2,500 rpm. Once all dry-blended materials had been added, the mixture in the blender was sheared at about 13,000 rpm for 35 seconds. Next, tests were run to determine the pump time of the sample composition at high temperature and high pressure according to API RP 10B, "Recommended Practices for Testing Oil-Well Cements and Cement Additives," dated 1974.

Sample Composition No. 15, a cement composition of the present invention, comprised Texas Lehigh Class H cement, 0.3% HR®-25 retarder bwoc, 35% SSA-1™ fine silica flour bwoc, 0.5% HALAD® 413 bwoc, 0.2% SA-541™ suspending aid bwoc, and 48.26% water bwoc.

Sample Composition No. 16, a cement composition of the present invention, comprised Texas Lehigh Class H cement, 1.2% maltodextrin 4.0-7.07 bwoc, 0.3% HR®-25 retarder bwoc, 35% SSA-1™ fine silica flour bwoc, 0.5% HALAD® 413 bwoc, 0.2% SA-541™ suspending aid bwoc, and 48.26% water bwoc.

Sample Composition No. 17, a cement composition of the present invention, comprised Texas Lehigh Class H cement, 1.2% maltodextrin 4.0-7.07 bwoc, 0.3% HR®-25 retarder bwoc, 35% SSA-1™ fine silica flour bwoc, 0.5% HALAD® 413 bwoc, 0.2% SA-541™ suspending aid bwoc, and 48.26% water bwoc.

TABLE 3

| Sample Composition | Water (% bwoc) | Maltodextrin (% bwoc) | SSA-1™ (% bwoc) | HALAD® 413 (% bwoc) | FWCA (% bwoc) | SA-541™ (% bwoc) | SUSPEND HT (% bwoc) | Test Temp. (° F.) | Pump Time (hr:min) |
|---|---|---|---|---|---|---|---|---|---|
| No. 12 | 39.3 | 1 | 0 | 0 | 0.1 | 0 | 0.2 | 350 | 2:33 |
| No. 13 | 48.26 | 1.2 | 35 | 0.5 | 0 | 0.2 | 0 | 300 | 1:13 |
| No. 14 | 48.26 | 1.5 | 35 | 0.5 | 0 | 0.2 | 0 | 350 | 1:11 |

Example 2 illustrates, inter alia, that the cement compositions of the present invention comprising maltodextrin are suitable for use in subterranean and surface cementing operations.

EXAMPLE 3

Sample cement compositions were prepared as follows. A cementitious material (Texas Lehigh Class H) and maltodextrin were dry blended by adding dry materials in a one-liter glass jar and shaking vigorously. In some sample cement compositions, as indicated below, one or more of the following additives were also dry blended with the sample cement compositions: HR®-25 retarder, SSA-1™ fine silica flour, HALAD® 413, and SA-541™ suspending aid. Next, a slurry was formed by adding an amount of water in a one-liter Sample Composition No. 18, a cement composition of the present invention, comprised Texas Lehigh Class H cement, 1.2% maltodextrin 4.0-7.07 bwoc, 0.3% HR®-25 retarder bwoc, 35% SSA-1™ fine silica flour bwoc, 0.5% HALAD® 413 bwoc, 0.2% SA-541™ suspending aid bwoc, and 48.26% water bwoc.

Sample Composition No. 19, a cement composition of the present invention, comprised Texas Lehigh Class H cement, 1.2% Maltodextrin 40 DE bwoc, 0.3% HR®-25 retarder bwoc, 35% SSA-1™ fine silica flour bwoc, 0.5% HALAD® 413 bwoc, 0.2% SA-541™ suspending aid bwoc, and 48.26% water bwoc.

Sample Composition No. 20, a cement composition of the present invention, comprised Texas Lehigh Class H cement, 1.2% maltodextrin 4.0-7.07 bwoc, 0.3% HR®-25 retarder bwoc, 35% SSA-1™ fine silica flour bwoc, 0.5% HALAD® 413 bwoc, 0.2% SA-541™ suspending aid bwoc, and 51.2% seawater bwoc.

The results of the testing are set forth in Table 4 below.

Example 3 illustrates, inter alia, that the cement compositions of the present invention comprising maltodextrin are suitable for use in subterranean and surface cementing operations.

strength 500 lbs/100 ft². At a gel strength of 500 lbs/100 ft² the cement slurry is considered viscous enough not to allow any gas flow into the annulus.

EXAMPLE 4

Sample cement compositions were prepared as follows. A cementitious material (Texas Lehigh Class H cement), mal-

TABLE 4

| Sample Composition | Water (% bwoc) | Maltodextrin (% bwoc) | HR®-25 (% bwoc) | SSA-1 ™ (% bwoc) | HALAD® 413 (% bwoc) | SA-541 ™ (% bwoc) | Test Temp. (° F.) | Pump Time (hr:min) |
|---|---|---|---|---|---|---|---|---|
| No. 15 | 48.26 | 0 | 0.3 | 35 | 0.5 | 0.2 | 300 | 1:33 |
| No. 16 | 48.26 | 1.2 | 0.3 | 35 | 0.5 | 0.2 | 300 | 4:27 |
| No. 17 | 48.26 | 1.2 | 0.3 | 35 | 0.5 | 0.2 | 325 | 2:48 |
| No. 18 | 48.26 | 1.2 | 0.3 | 35 | 0.5 | 0.2 | 350 | 2:14 |
| No. 19 | 48.26 | 1.2 | 0.3 | 35 | 0.5 | 0.2 | 300 | 3:59 |
| No. 20 | 51.2 | 1.2 | 0.3 | 35 | 0.5 | 0.2 | 300 | 2:51 |

Sample Composition No. 16 also was tested using an ultrasonic cement analyzer to determine its strength at a desired temperature and pressure, the results of which are shown in Table 5 below.

todextrin, and a chlorinated carbohydrate were dry blended by adding dry materials in a one-liter glass jar and shaking vigorously. In some sample cement compositions, as indicated below, one or more of the following additives were also

TABLE 5

| Sample Composition | Water (% bwoc) | Maltodextrin (% bwoc) | Test Temp. (° F.) | 500 Psi Time (hr:min) | 24 Hr. Strength (psi) | 40 Hr. Strength (psi) | 40 Hr. Crush (psi) |
|---|---|---|---|---|---|---|---|
| No. 16 | 48.26 | 1.2 | 300 | 13:13 | 3,785 | 4,725 | 7,480 |

Sample Composition No. 16 and Sample Composition Nos. 3 and 5 from Example 1 were also tested using a minimax cement analyzer, according to API Recommended Practice 10B-6 (ISO 10426-6), to determine the static gel strength of these sample compositions. The results of this testing are shown in Table 6 below.

dry blended with the sample cement compositions: SSA-1™ fine silica flour, FWCA additive, and SUSPEND HT anti-settling additive. Next, a slurry was formed by adding an amount of water in a one-liter Waring blender, and then adding the dry-blended materials while the blender operated at about 2,500 rpm. Once all dry-blended materials had been

TABLE 6

| Sample Composition | Water (% bwoc) | Maltodextrin (% bwoc) | Test Temp. (° F.) | Static Time (hr:min) | '0' Gel Time (hr:min) | Transition Time (hr:min) |
|---|---|---|---|---|---|---|
| No. 3 | 39.4 | 0.1 | 140-156 | 3:29 | 0:48 | 0:24 |
| No. 5 | 39.4 | 0.25 | 206-250 | 7:53 | 0:03 | 0:21 |
| No. 16 | 48.26 | 1.2 | 300 | 2:00 | 0:75 | 0:16 |
| No. 16 | 48.26 | 1.2 | 300 | 2:57 | 0:55 | 0:06 |

As may be seen from Table 6 above, Sample Composition No. 16 was tested twice.

In Table 6 above, the caption "Static Time (hr:min)" refers to the time the slurry was stirred before going static. The caption "'0' Gel Time (hr:min)" refers to the time after going static until static gel strength reaches 100 lbs/100 ft². The caption "Transition Time (hr:min)" refers to the time it takes to go from static gel strength 100 lbs/100 ft² to static gel added, the mixture in the blender was sheared at about 13,000 rpm for 35 seconds. Next, tests were run to determine the pump time of the sample composition at high temperature and high pressure according to API RP 10B, "Recommended Practices for Testing Oil-Well Cements and Cement Additives," dated 1974.

Sample Composition No. 21, a cement composition of the present invention, comprised Texas Lehigh Class H cement, 0.5% SPLENDA (comprising both maltodextrin and sucralose) bwoc, 35% SSA-1™ fine silica flour bwoc, and 48.55% water bwoc.

Sample Composition No. 22, a cement composition of the present invention, comprised Texas Lehigh Class H cement, 0.75% SPLENDA (comprising both maltodextrin and sucralose) bwoc, 35% SSA-1™ fine silica flour bwoc, 0.05% FWCA additive bwoc, and 48.55% water bwoc.

Sample Composition No. 23, a cement composition of the present invention, comprised Texas Lehigh Class H cement, 1% SPLENDA (comprising both maltodextrin and sucralose) bwoc, 35% SSA-1™ fine silica flour bwoc, 0.05% FWCA additive bwoc, and 48.55% water bwoc.

Sample Composition No. 24, a cement composition of the present invention, comprised Texas Lehigh Class H cement, 1% SPLENDA (comprising both maltodextrin and sucralose) bwoc, 35% SSA-1™ fine silica flour bwoc, 0.1% FWCA additive bwoc, 0.2% SUSPEND HT anti-settling additive bwoc, and 48.55% water bwoc.

Sample Composition No. 25, a cement composition of the present invention, comprised Texas Lehigh Class H cement, 1.5% SPLENDA (comprising both maltodextrin and sucralose) bwoc, 35% SSA-1™ fine silica flour bwoc, 0.05% FWCA additive bwoc, and 48.55% water bwoc.

Sample Composition No. 26, a cement composition of the present invention, comprised Texas Lehigh Class H cement, 1.5% SPLENDA (comprising both maltodextrin and sucralose) bwoc, 35% SSA-1™ fine silica flour bwoc, 0.1% FWCA additive bwoc, 0.2% SUSPEND HT anti-settling additive bwoc, and 48.55% water bwoc.

Sample Composition No. 27, a cement composition of the present invention, comprised Texas Lehigh Class H cement, 2% SPLENDA (comprising both maltodextrin and sucralose) bwoc, 35% SSA-1™ fine silica flour bwoc, 0.1% FWCA additive bwoc, 0.2% SUSPEND HT anti-settling additive bwoc, and 48.55% water bwoc.

The results of the testing are set forth in Table 7 below.

TABLE 7

| Sample Composition | Water (% bwoc) | SPLENDA (% bwoc) | SSA-1 ™ (% bwoc) | FWCA (% bwoc) | SUSPEND HT (% bwoc) | Test Temp. (° F.) | Pump Time (hr:min) |
|---|---|---|---|---|---|---|---|
| No. 21 | 48.55 | 0.50 | 35 | 0 | 0 | 250 | 0:55 |
| No. 22 | 48.55 | 0.75 | 35 | 0.05 | 0 | 250 | 0:52 |
| No. 23 | 48.55 | 1.0 | 35 | 0.05 | 0 | 250 | 0:56 |
| No. 24 | 48.55 | 1.0 | 35 | 0.1 | 0.2 | 300 | 1:33 |
| No. 25 | 48.55 | 1.5 | 35 | 0.05 | 0 | 250 | 0:36 |
| No. 26 | 48.55 | 1.5 | 35 | 0.1 | 0.2 | 350 | 1:21 |
| No. 27 | 48.55 | 2.0 | 35 | 0.1 | 0.2 | 395 | 1:15 |

Sample Composition No. 24 also was tested using an ultrasonic cement analyzer to determine its strength at a desired temperature and pressure, the results of which are shown in Table 8 below.

TABLE 8

| Sample Composition | Water (% bwoc) | SPLENDA (% bwoc) | Test Temp. (° F.) | 500 Psi Time (hr:min) | 24 Hr. Strength (psi) | 48 Hr. Strength (psi) |
|---|---|---|---|---|---|---|
| No. 24 | 48.55 | 1.0 | 300 | 12:31 | 3,369 | 3,540 |

Example 4 illustrates, inter alia, that the cement compositions of the present invention comprising maltodextrin and chlorinated carbohydrates are suitable for use in subterranean and surface cementing operations.

EXAMPLE 5

Sample cement compositions were prepared as follows. A cementitious material (Texas Lehigh Class H cement), maltodextrin, and a chlorinated carbohydrate were dry blended by adding dry materials in a one-liter glass jar and shaking vigorously. In some sample cement compositions, as indicated below, one or more of the following additives were also dry blended with the sample cement compositions: disodium octaborate, HR®-25 retarder, SSA-1™ fine silica flour, FWCA additive, and SUSPEND HT anti-settling additive. Next, a slurry was formed by adding an amount of water in a one-liter Waring blender, and then adding the dry-blended materials while the blender operated at about 2,500 rpm. Once all dry-blended materials had been added, the mixture in the blender was sheared at about 13,000 rpm for 35 seconds. Next, tests were run to determine the pump time of the sample composition at high temperature and high pressure according to API RP 10B, "Recommended Practices for Testing Oil-Well Cements and Cement Additives," dated 1974.

Sample Composition No. 28 comprised Texas Lehigh Class H cement, 0.25% HR®-25 retarder bwoc, 35% SSA-1™ fine silica flour bwoc, 0.1% FWCA additive bwoc, 0.2% SUSPEND HT anti-settling additive bwoc, and 48.42% water bwoc.

Sample Composition No. 29 comprised Texas Lehigh Class H cement, 1% disodium octoborate bwoc, 35% SSA-1™ fine silica flour bwoc, and 48.55% water bwoc.

Sample Composition No. 30, a cement composition of the present invention, comprised Texas Lehigh Class H cement, 0.5% SPLENDA (comprising both maltodextrin and sucralose) bwoc, 1% disodium octoborate bwoc, 35% SSA-1™ fine silica flour bwoc, 0.2% SUSPEND HT anti-settling additive bwoc, and 48.55% water bwoc.

Sample Composition No. 31, a cement composition of the present invention, comprised Texas Lehigh Class H cement, 0.5% SPLENDA (comprising both maltodextrin and sucralose) bwoc, 0.5% disodium octoborate bwoc, 35% SSA-1™ fine silica flour bwoc, 0.05% FWCA additive bwoc, 0.2% SUSPEND HT anti-settling additive bwoc, and 48.55% water bwoc.

Sample Composition No. 32, a cement composition of the present invention, comprised Texas Lehigh Class H cement, 1% SPLENDA (comprising both maltodextrin and sucralose) bwoc, 0.25% HR®-25 retarder bwoc, 35% SSA-1™ fine silica flour bwoc, 0.1% FWCA additive bwoc, 0.2% SUSPEND HT anti-settling additive bwoc, and 48.42% water bwoc.

Sample Composition No. 33, a cement composition of the present invention, comprised Texas Lehigh Class H cement, 1.2% SPLENDA (comprising both maltodextrin and sucralose) bwoc, 0.3% HR®-25 retarder bwoc, 35% SSA-1™ fine silica flour bwoc, 0.1% FWCA additive bwoc, 0.2% SUSPEND HT anti-settling additive bwoc, and 48.42% water bwoc.

The results of the testing are set forth in Table 9 below.

TABLE 9

| Sample Composition | Water (% bwoc) | SPLENDA (% bwoc) | Disodium Octoborate (% bwoc) | HR ®-25 (% bwoc) | SSA-1 ™ (% bwoc) | FWCA (% bwoc) | SUSPEND HT (% bwoc) | Test Temp. (° F.) | Pump Time (hr:min) |
|---|---|---|---|---|---|---|---|---|---|
| No. 28 | 48.42 | 0 | 0 | 0.25 | 35 | 0.1 | 0.2 | 300 | 2.51 |
| No. 29 | 48.55 | 0 | 1 | 0 | 35 | 0 | 0 | 300 | 0:53 |
| No. 30 | 48.55 | 0.5 | 1 | 0 | 35 | 0 | 0.2 | 300 | 1:28 |
| No. 31 | 48.55 | 0.5 | 0.5 | 0 | 35 | 0.05 | 0.2 | 350 | 1:18 |
| No. 32 | 48.42 | 1.0 | 0 | 0.25 | 35 | 0.1 | 0.2 | 300 | 4:40 |
| No. 33 | 48.42 | 1.2 | 0 | 0.3 | 35 | 0.1 | 0.2 | 300 | 5:15 |

Sample Composition Nos. 28, 32, and 33 also were tested using an ultrasonic cement analyzer to determine their strength at a desired temperature and pressure, the results of which are shown in Table 10 below.

TABLE 10

| Sample Composition | Water (% bwoc) | SPLENDA (% bwoc) | HR ®-25 (% bwoc) | Test Temp. (° F.) | 500 Psi Time (hr:min) | 24 Hr. Strength (psi) | 48 Hr. Strength (psi) |
|---|---|---|---|---|---|---|---|
| No. 28 | 48.42 | 0 | 0.25 | 300 | 6:24 | 4,397 | 4,479 |
| No. 32 | 48.42 | 1.0 | 0.25 | 300 | 7:34 | 5,544 | 5,800 (at 46 hr) |
| No. 33 | 48.42 | 1.2 | 0.3 | 300 | NA | 1,910 (Crush) | NA |

Example 5 illustrates, inter alia, that the cement compositions of the present invention comprising maltodextrin are suitable for use in subterranean and surface cementing operations.

EXAMPLE 6

Sample cement compositions were prepared as follows. A cementitious material (Texas Lehigh Class H cement), maltodextrin, a chlorinated carbohydrate, and disodium octoborate were dry blended by adding dry materials in a one-liter glass jar and shaking vigorously. Next, a slurry was formed by adding an amount of water in a one-liter Waring blender, and then adding the dry-blended materials while the blender operated at about 2,500 rpm. Once all dry-blended materials had been added, the mixture in the blender was sheared at about 13,000 rpm for 35 seconds. Next, tests were run to determine the pump time of the sample composition at high temperature and high pressure according to API RP 10B, "Recommended Practices for Testing Oil-Well Cements and Cement Additives," dated 1974.

Sample Composition No. 34 comprised Texas Lehigh Class H cement, 0.1% disodium octoborate bwoc, and 39.4% water bwoc.

Sample Composition No. 35 comprised Texas Lehigh Class H cement, 0.2% disodium octoborate bwoc, and 39.4% water bwoc.

Sample Composition No. 36 comprised Texas Lehigh Class H cement, 0.25% disodium octoborate bwoc, and 39.4% water bwoc.

Sample Composition No. 37 comprised Texas Lehigh Class H cement, 0.3% disodium octoborate bwoc, and 39.4% water bwoc.

Sample Composition No. 38, a cement composition of the present invention, comprised Texas Lehigh Class H cement, 0.05% SPLENDA (comprising both maltodextrin and sucralose) bwoc, 0.1% disodium octoborate bwoc, and 39.4% water bwoc.

Sample Composition No. 39, a cement composition of the present invention, comprised Texas Lehigh Class H cement, 0.1% SPLENDA (comprising both maltodextrin and sucralose) bwoc, 0.1% disodium octoborate bwoc, and 39.4% water bwoc.

The results of the testing are set forth in Table 11 below.

TABLE 11

| Sample Composition | Water (% bwoc) | SPLENDA (% bwoc) | Disodium Octoborate (% bwoc) | Test Temp. (° F.) | Pump Time (hr:min) |
|---|---|---|---|---|---|
| No. 34 | 39.4 | 0 | 0.1 | 190 | 2:26 |
| No. 35 | 39.4 | 0 | 0.2 | 190 | 3:45 |
| No. 36 | 39.4 | 0 | 0.25 | 206 | 2:02 |
| No. 37 | 39.4 | 0 | 0.3 | 190 | 5:00+ |
| No. 38 | 39.4 | 0.05 | 0.1 | 190 | 6:00 |
| No. 39 | 39.4 | 0.1 | 0.1 | 190 | 4:50+ |

The pump times for Sample Compositions Nos. 37 and 39 were determined to exceed 5 hours and 4 hours 50 minutes, respectively, but the precise pump times were not determined.

Example 6 illustrates, inter alia, that the cement compositions of the present invention comprising maltodextrin and chlorinated carbohydrates are suitable for use in subterranean and surface cementing operations.

EXAMPLE 7

Sample compositions were prepared as follows. A cementitious material (Texas Lehigh Class H cement) and an additive of the present invention comprising maltodextrin (in the form of SPLENDA) and HR®-25 retarder were dry blended by adding dry materials in a one-liter glass jar and shaking vigorously. The additive of the present invention comprising maltodextrin and HR®-25 comprised a blend of 1 part HR®-25 retarder and 4 parts SPLENDA. In some sample compositions one or more of the following additives were also dry blended with the sample compositions: SSA-1™ fine silica flour, FWCA additive, and SUSPEND HT anti-settling additive. Next, a slurry was formed by adding an amount of water in a one-liter Waring blender, and then adding the dry-blended materials while the blender operated at about 2,500 rpm. Once all dry-blended materials had been added, the mixture in the blender was sheared at about 13,000 rpm for 35 seconds. Next, tests were run to determine the pump time of the sample composition at high temperature and high pressure according to API RP 10B, "Recommended Practices for Testing Oil-Well Cements and Cement Additives," dated 1974.

Sample Composition No. 40, a cement composition of the present invention, comprised Texas Lehigh Class H cement, 1% additive of the present invention comprising maltodextrin and HR®-25 retarder, 35% SSA-1™ fine silica flour bwoc, 0.05% FWCA additive bwoc, and 48.5% water bwoc.

Sample Composition No. 41, a cement composition of the present invention, comprised Texas Lehigh Class H cement, 1.25% additive of the present invention comprising maltodextrin and HR®-25 retarder, 35% SSA-1™ fine silica flour bwoc, 0.1% FWCA additive bwoc, 0.2% SUSPEND HT anti-settling additive bwoc, and 48.42% water bwoc.

Sample Composition No. 42, a cement composition of the present invention, comprised Texas Lehigh Class H cement, 2% additive of the present invention comprising maltodextrin and HR®-25 retarder, 35% SSA-1™ fine silica flour bwoc, 0.15% FWCA additive bwoc, 0.3% SUSPEND HT anti-settling additive bwoc, and 48.4% water bwoc.

Sample Composition No. 43, a cement composition of the present invention, comprised Texas Lehigh Class H cement, 3% additive of the present invention comprising maltodextrin and HR®-25 retarder, 35% SSA-1™ fine silica flour bwoc, 0.1% FWCA additive bwoc, 0.25% SUSPEND HT anti-settling additive bwoc, and 48.44% water bwoc.

The results of the testing are set forth in Table 12 below.

Example 7 illustrates, inter alia, that the cement compositions of the present invention comprising the additives of the present invention are suitable for use in subterranean and surface cementing operations.

EXAMPLE 8

Sample cement compositions were prepared as follows. A cementitious material (Texas Lehigh Class H cement) and maltodextrin 4.0-7.07 were dry blended by adding dry materials in a one-liter glass jar and shaking vigorously. In some sample cement compositions, as indicated below, one or more of the following additives were also blended with the sample cement compositions: HR®-25 retarder, SSA-1™ fine silica flour, LATEX 2000™ HALAD® 9, HALAD® 344, HALAD® 400, and HALAD® 413, D-AIR 3000L, Stabilizer 434D, and SA-541™suspending aid. The compositions were prepared at about 80° F., and rheological testing was performed using a FANN 35 viscometer, with a B1 bob and #1 spring. The sample compositions were placed in an atmospheric consistometer, stirred for 20 minutes, heated to about 180° F., and placed in the FANN 35 viscometer. Data was collected in a heated mud cup at various rotation speeds of the FANN 35 viscometer sleeve. Recorded RPM readings were then used to calculate the plastic viscosity (PV) and yield point (YP) using the following equations:

PV=1.5[300RPM−100RPM], wherein PV is expressed in units of centipoise.

YP=300RPM−PV, wherein YP is expressed in units of lbs/100 ft$^2$.

Fluid loss tests were performed by placing each sample composition in a fluid loss cell with a 325 mesh screen. The fluid loss cell was preheated to about 180° F. The sample composition was placed in the fluid loss cell, and a lid was applied to the cell. A differential pressure of about 1,000 psid was applied to the fluid, and the filtrate collected through the screen was measured at 30 minutes after the pressure was applied.

Sample Composition No. 44, a cement composition of the present invention, comprised Texas Lehigh Class H cement, 0.25% maltodextrin 4.0-7.07 bwoc, 0.7% HALAD® 9 bwoc, and 39.89% water bwoc.

Sample Composition No. 45, a cement composition of the present invention, comprised Texas Lehigh Class H cement, 0.25% maltodextrin 4.0-7.07 bwoc, 0.5% HALAD®344 bwoc, and 39.89% water bwoc.

Sample Composition No. 46, a cement composition of the present invention, comprised Texas Lehigh Class H cement, 1.2% maltodextrin 4.0-7.07 bwoc, 0.3% HR®-25 retarder

TABLE 12

| Sample Composition | Water (% bwoc) | Additive Comprising Maltodextrin (as SPLENDA) and HR ®-25 (% bwoc) | SSA-1 ™ (% bwoc) | FWCA (% bwoc) | SUSPEND HT (% bwoc) | Test Temp. (° F.) | Pump Time (hr:min) |
|---|---|---|---|---|---|---|---|
| No. 40 | 48.5 | 1 | 35 | 0.05 | 0 | 250 | 3:24 |
| No. 41 | 48.42 | 1.25 | 35 | 0.1 | 0.2 | 300 | not determined |
| No. 42 | 48.4 | 2 | 35 | 0.15 | 0.3 | 400 | 2:18 |
| No. 43 | 48.44 | 3 | 35 | 0.1 | 0.25 | 400 | 3:00 | bwoc, 35% SSA-1™ fine silica flour bwoc, 0.5% HALAD® 413 bwoc, 0.2% SA-541™ suspending aid bwoc, and 48.26% water bwoc.

Sample Composition No. 47, a cement composition of the present invention, comprised Texas Lehigh Class H cement, 1.2% maltodextrin 4.0-7.07 bwoc, 0.3% HR®-25 retarder bwoc, 35% SSA-1™ fine silica flour bwoc, 0.23 gallons per sack (of cement) HALAD®400 L, 0.2% SA-541™ suspending aid bwoc, and 46.57% water bwoc.

Sample Composition No. 48, a cement composition of the present invention, comprised Texas Lehigh Class H cement, 0.25% maltodextrin 4.0-7.07 bwoc, 1.5 gallons per sack (of cement) LATEX 2000, 0.15 gallons per sack (of cement) STABILIZER 434D, 0.05 gallons per sack (of cement) D-AIR 3000L, and 24.4% water bwoc.

The results of the testing are set forth in Table 13 below.

TABLE 13

| Sample Composition | Water (% bwoc) | Maltodextrin (% bwoc) | Fluid Loss Additive (% bwoc) | Other Additive | HR®-25 (% bwoc) | SSA-1™ (% bwoc) | SSA-541™ (% bwoc) |
|---|---|---|---|---|---|---|---|
| No. 44 | 38.98 | 0.25 | 0.7 HALAD-9 | 0 | 0 | 0 | 0 |
| No. 45 | 38.98 | 0.25 | 0.5 HALAD-344 | 0 | 0 | 0 | 0 |
| No. 46 | 48.26 | 1.2 | 0.5 HALAD-413 | 0 | 0.3 | 35 | 0.2 |
| No. 47 | 46.57 | 1.2 | 0 | 0.23 gal/sack HALAD-400 L | 0.3 | 35 | 0.2 |
| No. 48 | 24.4 | 0.25 | 0 | 1.5 gal/sack LATEX 2000; 0.15 gal/sack Stabilizer 434D; 0.05 gal/sack D-AIR 3000 L | 0 | 0 | 0.1 |

| Sample Composition | Test Temp. (° F.) | 300 RPM | 200 RPM | 100 RPM | 6 RPM/ 3 RPM | PV\YP | 180 F. Fluid Loss |
|---|---|---|---|---|---|---|---|
| No. 44 | 80 | 200 | 151 | 91 | 12\9 | 163\41 | 80 |
|  | 180 | 110 | 75 | 40 | 5/2 | 5\3 |  |
| No. 45 | 80 | 262 | 191 | 111 | 13\9 | 239\28 | 44 |
|  | 180 | 213 | 153 | 89 | 9\7 | 190\26 |  |
| No. 46 | 80 | 186 | 130 | 74 | 13\10 | 179\10 | 40 |
|  | 180 | 402 | 292 | 172 | 22\15 | 344\62 |  |
| No. 47 | 80 | 230 | 150 | 72 | 4\2 | 226\3 | 32 |
|  | 180 | 382 | 280 | 162 | 19\14 | 329\58 |  |
| No. 48 | 80 | 71 | 49 | 26 | 3\2 | 67\4 | 600 |
|  | 180 | 270 | 204 | 66 | 30\24 | 198\77 |  |

Example 8 illustrates, inter alia, that the cement compositions of the present invention comprising maltodextrin are suitable for use in subterranean and surface cementing operations.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A well bore cement composition comprising:
   a hydraulic cement;
   water, wherein the water is present in an amount sufficient to create a pumpable slurry; and
   an additive comprising maltodextrin, wherein the maltodextrin is present in the well bore cement composition in an amount in the range of from greater than 1.6% to about 5% by weight of the hydraulic cement.

2. The well bore cement composition of claim 1 wherein the water is present in the cement composition in an amount in the range of from about 15% to about 200% by weight of the hydraulic cement.

3. The well bore cement composition of claim 1 wherein the additive further comprises one or more organic acids.

4. The well bore cement composition of claim 1 wherein the additive further comprises at least one organic acid selected from the group consisting of: tartaric acid, gluconic acid, citric acid, and a salt thereof.

5. The well bore cement composition of claim 1 further comprising one or more second additives, wherein the one or more second additives comprise at least one compound selected from the group consisting of: a dispersant, a hydratable polymer, and a retarder.

6. The well bore cement composition of claim 1 wherein the maltodextrin is present in the additive in an amount in the range of from about 0.01% to about 99.9% by weight of the additive.

7. The well bore cement composition of claim 1 wherein the additive is present in the cement composition in an amount in the range of from greater than 1.6% to about 2% by weight of the hydraulic cement.

8. The well bore cement composition of claim 1 wherein the additive further comprises at least one additive selected from the group consisting of: a borate compound, a phosphorus compound, a lignin, a tannin, and a sugar compound.

9. The well bore cement composition of claim 1 wherein the additive further comprises an organic acid present in an amount in the range of from about 0.01% to about 99.9% by weight of the additive.

10. The well bore cement composition of claim 1 wherein the additive further comprises a chlorinated carbohydrate.

11. A cement composition comprising:
a hydraulic cement;
water, wherein the water is present in an amount sufficient to create a pumpable slurry; and
an additive comprising maltodextrin and an organic acid, wherein:
the additive is present in the cement composition in an amount in the range of from 0.04% to about 5% by weight of the hydraulic cement; and
the maltodextrin is present in the additive in the range of from about 40% to about 99.9% by weight.

12. The cement composition of claim 11 wherein the organic acid comprises at least one organic acid selected from the group consisting of: tartaric acid, gluconic acid, citric acid, and a salt thereof.

13. The cement composition of claim 11 wherein the additive further comprises at least one compound selected from the group consisting of: a borate compound, a phosphorus compound, a lignin, a tannin, and a sugar compound.

14. The cement composition of claim 11 wherein the additive further comprises a chlorinated carbohydrate.

15. A well bore cement composition comprising:
a hydraulic cement;
water, wherein the water is present in an amount sufficient to create a pumpable slurry; and
an additive comprising maltodextrin and tartaric acid, wherein:
the maltodextrin is present in the additive in an amount in the range of from about 0.01% to about 99.9% by weight;
the tartaric acid is present in the additive in an amount in the range of from about 0.01% to about 99.9% by weight; and
the maltodextrin is present in the well bore cement composition in an amount in the range of from 0.04% to about 5% by weight of the hydraulic cement.

16. The well bore cement composition of claim 15 wherein the maltodextrin is present in the additive in an amount in the range of from about 40% to about 60% by weight, and the tartaric acid is present in the additive in an amount in the range of from about 40% to about 60% by weight.

17. The well bore cement composition of claim 15 wherein the additive further comprises at least one compound selected from the group consisting of: a borate compound, a phosphorus compound, a lignin, a tannin, and a sugar compound.

18. The well bore cement composition of claim 15 further comprising at least one additive selected from the group consisting of: a dispersant, a hydratable polymer, and a retarder.

19. The well bore cement composition of claim 15 wherein the additive further comprises a chlorinated carbohydrate.

20. The well bore cement composition of claim 1 wherein the additive consists essentially of maltodextrin.

21. The well bore cement composition of claim 1 wherein the additive consists of maltodextrin.

22. The well bore cement composition of claim 3 wherein the additive consists essentially of maltodextrin and one or more organic acids.

23. The well bore cement composition of claim 3 wherein the additive consists of maltodextrin and one or more organic acids.

* * * * *